EQUIPMENT HOUSING ARRANGEMENTS

Filed April 7, 1966

United States Patent Office 3,390,541

Patented July 2, 1968

3,390,541

EQUIPMENT HOUSING ARRANGEMENTS

David P. Johnson and John A. Baldry, Emsworth, England, assignors to The Plessey Company Limited, Ilford, England, a British company Filed Apr. 7, 1966, Ser. No. 540,862
Claims priority, application Great Britain, Apr. 9, 1965, 15,310/65
4 Claims. (Cl. 62—217)

ABSTRACT OF THE DISCLOSURE

A sealable container for a volatile liquid used in the evaporative cooling of electrical apparatus, a wall of the container including a flexible diaphragm supported against an external cover having an air vent. The flexible diaphragm is able to collapse inwards to prevent the pressure within the container from falling below the atmospheric pressure so that voltage breakdowns are minimized.

This invention relates to equipment housing arrangements and relates more specifically to arrangements for housing electrical equipment which is liable to become heated when in service.

Liquid filled, evaporatively cooled housings for electrical equipment, such as medium power transmitters, airborne equipment and high voltage power supplies, can be of more compact construction than their conventional counterparts. The housings however must be sealed to prevent the ingress of dust and moisture and the gross leakage of liquid or vapour from the housing. The type of seal usually used at present is such that in time sufficient air will leak into the housing to interrupt the cooling process. Trapped air above the surface of the coolant liquid can then act as an insulating layer which will prevent proper thermal contact between the coolant vapour and any cooling vanes. The coolant vapour is then unable to condense and drip back into the boiling coolant. Further, in a sealed equipment at low operating temperatures, the internal pressure in the housing may be low and this can cause a deterioration in the dielectric strength of the vapour-air mixture.

According to one feature of the invention, a housing for containing coolant liquid to be used in the evaporative cooling of electrical equipment comprises a housing including a non-return pressure relief valve which is connected to the housing at a point which when the housing is in its normal attitude for service will be above the level of a heat exchanger for extracting heat from the vapour of coolant liquid in the housing. There may be a small particle filter positioned on the side of the non-return pressure relief valve from which coolant vapour in the housing may enter the valve.

The non-return pressure relief valve may comprise an absolute pressure sensor, using for instance a vacuum as a reference pressure, possibly used in co-operation with an electromechanical valve.

According to a further feature of the invention, a liquid filled, evaporatively cooled housing which includes a non-return valve also comprises means for preventing the pressure in the housing falling below an ambient pressure. Conveniently this may be done by reducing the volume of the housing such as by the provision of a flexible diaphragm in a wall of the housing.

Embodiments of the invention will be further explained with reference to the drawings accompanying the specification.

Figure 1:
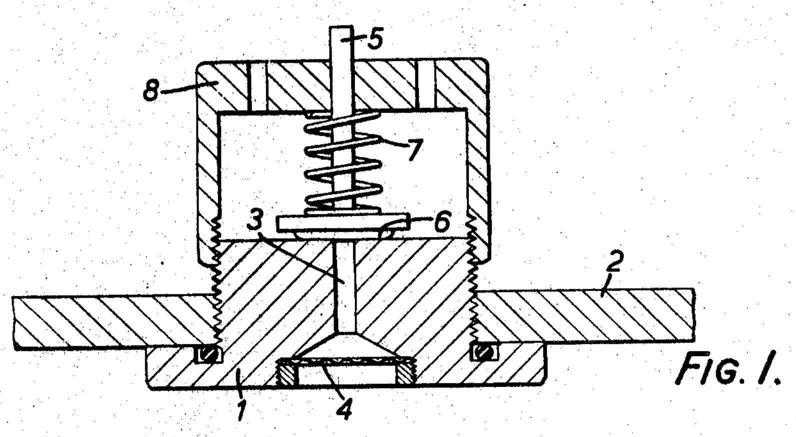
Figure 2:
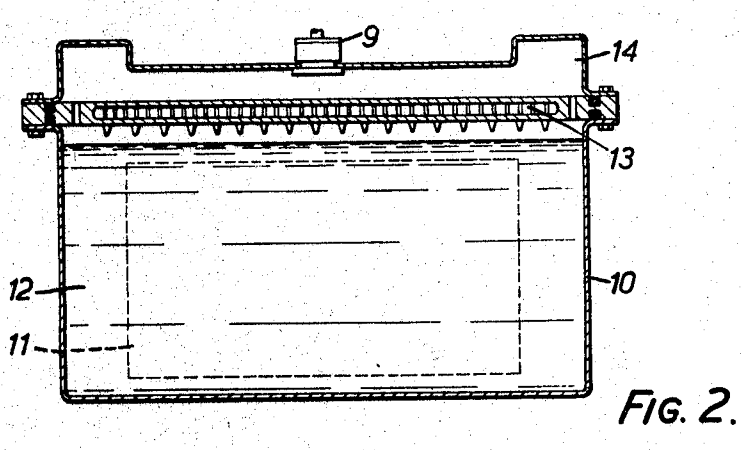
Figure 3:
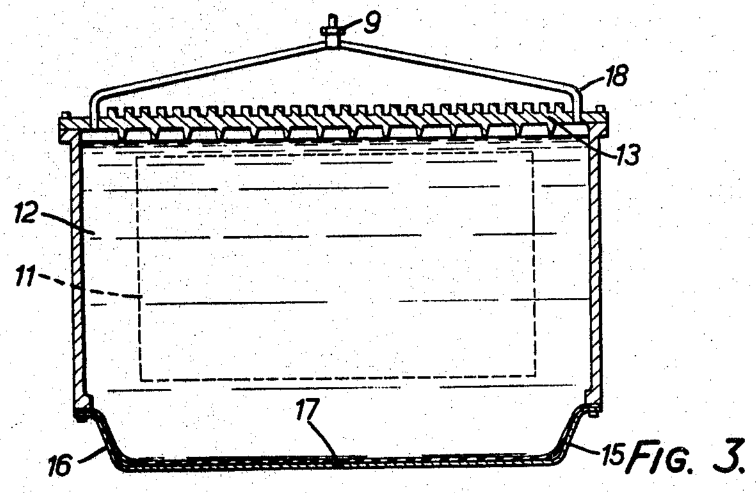

FIGURE 1 shows an axial cross section through a non-return pressure relief valve according to the invention, FIGURE 2 is a cross section through a liquid filled evaporatively cooled housing for electrical equipment including a non-return pressure relief valve, and FIGURE 3 is a cross-section through a different type of housing including a flexible diaphragm for preventing pressure in the housing from falling below the ambient pressure.

As shown in FIGURE 1, the non-return pressure relief valve comprises a body 1 which is supported in the wall 2 of the liquid filled evaporatively cooled housing. A passage 3 through the body 1 is covered at its inner end with a small particle filter 4 which may be a sintered disc type of filter. An outer end of the passage 3 is sealed with a plunger 5 having an O-ring seat 6. A spring 7 which is supported by a nut 8 holds the plunger 5 so as to close the end of the passage 3. The nut 8 may be adjusted on the body 1 so that the valve will be opened at a predetermined internal pressure in the housing which will be the blow-off pressure.

In FIGURE 2, the relief valve 9 is shown fitted into place in a housing 10. The housing 10 is used to enclose a piece of electrical equipment 11 which is immersed in a suitable coolant liquid 12 for evaporation cooling of the equipment. One example of a liquid that is suitable for this use as a dielectric cooling medium is FC–75 (3M Brand Inert Fluorochemical Liquid FC–75, from Minnesota Mining and Manufacturing Co. Ltd., London, England). Above the surface of this liquid 12 a heat exchanger 13 is mounted in the housing. The housing 10 also includes a void space 14 in which any air that may enter the housing can be accommodated above the level to which the evaporated coolant would normally be expected to rise.

The non-return pressure relief valve 9 may be used to purge excess air from the system without excessive loss of coolant. To do this the valve must be situated above the cooling vanes of the internal heat exchanger 13 and there must be an adequate void above the heat exchanger to ensure separation of the coolant vapour from the air and to allow the housing as a whole to be unaffected by tilting at a reasonable angle. At the maximum external ambient temperature, when the air has been purged to above the heat exchanger vanes, the cooling process must be adequate to keep down the temperature to ensure that the coolant vapour pressure remains below the blow-off pressure.

When the housing is intended to be used in an aircraft, the pressure relief valve must be set at a sufficiently high pressure to ensure the coolant boiling temperature is still adequate at high altitudes. The risk of accidental opening under shock conditions can be minimised by the use of a mass balanced relief valve.

The saturated coolant vapour must also be heavy compared with air.

At low pressures the voltage breakdown of an air or vapour gap is greatly reduced and in equipment where high voltages are present this can inhibit compact design. The low pressures can occur at low operating temperatures just after switch on or at very low external ambient temperatures. Under these conditions the coolant vapour pressure is low and any residual air has to fill a large void due to the air solubility and contraction of the coolant.

In the construction shown in FIGURE 2 the air space 14 ensures that it is impossible to purge all the air from the system. This residual air will then exert sufficient pressure at low temperatures to avoid voltage breakdown. The void space in this design of housing also allows the housing to be tilted to a greater angle before the relief valve 9 is likely to be immersed in the coolant.

If use of the relief valve is not desirable, this can be avoided by increasing the void space and/or the working pressure until all the air that would be contained at atmospheric pressure and the lowest storage temperature can, under operating conditions, be accommodated above the heat exchanger. This technique however, will reduce the degree of compactness that can be obtained.

FIGURE 3 shows an alternative way of preventing pressure in the housing from falling below the ambient pressure by incorporating a flexible diaphragm 15. During normal operation when the pressure is above ambient the diaphragm 15 is constrained by an external cover 16 having an air vent 17 and the pressure may rise until the relief valve 9 operates. When the internal pressure starts to fall below ambient the diaphragm 15 collapses inwards, the void space becoming full of coolant. The diaphragm also allows for the reduction in volume of the coolant due to contraction on cooling.

In order to reduce the size of void space, to avoid excessive movement of the diaphragm, pipes 18 are taken from each of four corners of the housing diagonally up to the relief valve 9. This arrangement allows for a good angle of tilt of the housing without providing the internal volume that would be unavoidable if the housing had a conical top.

The foregoing description of embodiments of the invention have been given by way of example only and a number of modifications may be made without departing from the scope of the invention. For instance, in the previous paragraph the diaphragm used to avoid low pressures occurring in the housing may be replaced by any other suitable device such as a bellows.

What we claim is:

1. A sealable container having walls and including a volatile liquid therein for electrical apparatus which may be immersed in said liquid, the evaporation of the liquid aiding cooling of the apparatus, the container comprising a heat exchanger located above the normal level of the liquid, a flexible diaphragm positioned below the normal level of the liquid, an external cover for said diaphragm, and an air vent in said cover.

2. A container as claimed in claim 1 in which said heat exchanger forms part of the wall of said container.

3. A container as claimed in claim 1 including a pressure relief valve.

4. A container as claimed in claim 3 in which said container is rectangular in plan, said pressure relief valve being located above the heat exchanger in the normal attitude for operation of the container, a pipe from each upper corner of the container connecting the corner with the pressure relief valve.

References Cited

UNITED STATES PATENTS

| | | | |
|---|---|---|---|
| 854,276 | 5/1907 | Darlington | 62—119 |
| 2,083,611 | 6/1937 | Marshall | 62—119 |
| 2,961,476 | 11/1960 | Maslin | 62—119 |

MEYER PERLIN, *Primary Examiner.*